Feb. 11, 1958 — A. MUELLER — 2,822,974
TURBINE-DRIVEN SUPERCHARGER
Filed April 5, 1954
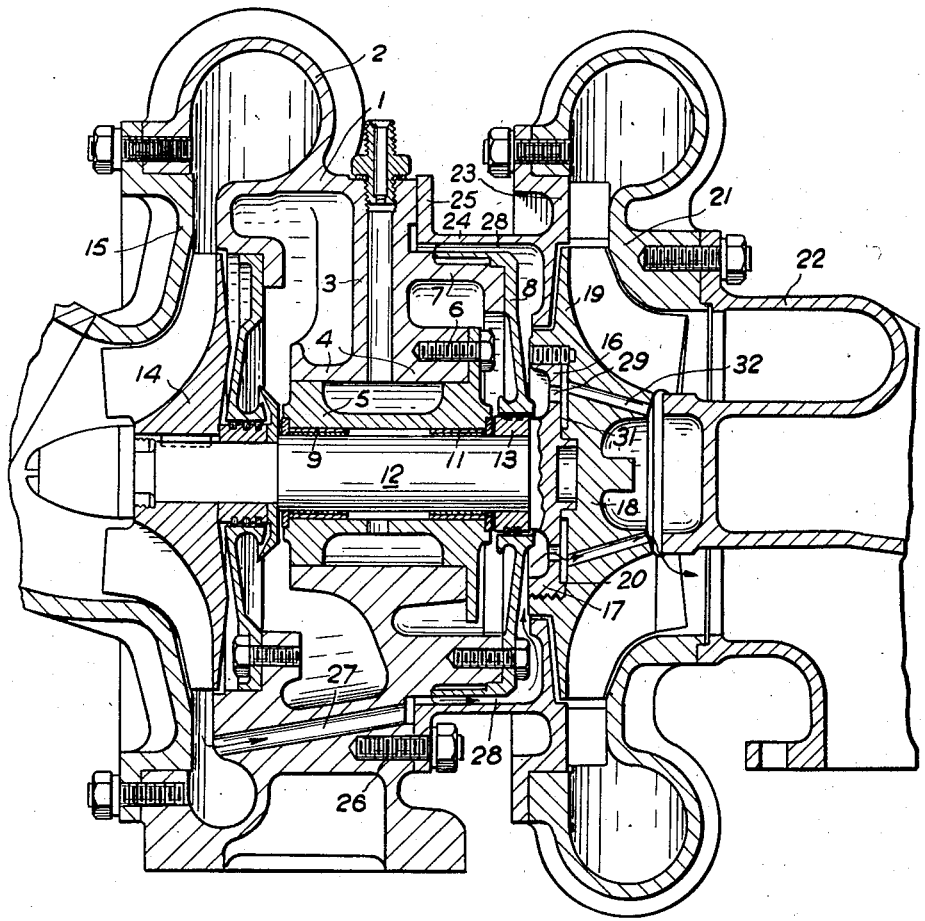
INVENTOR
Alfred Mueller
BY
ATTORNEY

2,822,974

TURBINE-DRIVEN SUPERCHARGER

Alfred Mueller, Penwortham, Preston, England, assignor to Leyland Motors Limited, London, England, a British company Application April 5, 1954, Serial No. 420,827

Claims priority, application Great Britain April 7, 1953

1 Claim. (Cl. 230—116)

This invention relates to an air compressor for supercharging internal combustion engines which is driven by a turbine employing as working fluid the exhaust gas of the engine. The purpose of the invention is to enable compressor and exhaust gas turbine to be combined into one unit. For this purpose the rotor or impeller of the turbine must be mechanically connected with the rotor or impeller of the compressor to drive it and the housing of the turbine must be attached to the housing of the compressor. Now the turbine is inevitably working at a high temperature and otherwise under severe conditions and must be built of materials suited to these conditions. The compressor on the other hand, aside from its association with the turbine, is not subject to severe conditions and could well be made to a large extent of light alloy; but if such material is to be used the compressor must be protected from the heat of the turbine. Still more necessary is it that the bearings of the common shaft of the turbine and compressor impellers shall be protected from undue heating.

To this end it is one object of the present invention to make the necessary mechanical connections between turbine impeller and compressor impeller and between turbine housing and compressor housing of such form and disposition that the compressor and especially the bearings of the compressor-turbine shaft receive little heat by conduction from the turbine.

It is a further object of the invention to reduce the transfer of heat by nearly everywhere interposing between the turbine and the compressor a sheet flow of air which can readily be drawn from the delivery side of the compressor. Such flow of air may bathe the surfaces of the parts of small conductivity which unite the impellers and the housings respectively.

A more specific object of the invention is a combined turbine and compressor in which the housings of the two elements are united by a thin shell disposed at a considerable radial distance from the shaft and bearings of the combined machine.

Yet another object of the invention is a combined turbine and compressor wherein the turbine impeller is connected to the common shaft through a thin disc-like radial expansion of the shaft to the periphery of which the turbine impeller is attached, the construction being such that except at the point of attachment the turbine impeller is spaced from this disc-like expansion. Thus the mechanical connection is of small conductivity and its area of contact with the turbine is well away from the bearings of the common shaft.

It is a further feature of the invention to circulate cooling air through the space between the turbine impeller and the disc-like expansion upon the shaft to the periphery of which it is joined.

Yet another feature of the invention is a turbine impeller made with air passages through its hub in combination with means by which air from the compressor is circulated through these passages to cool the hub.

An exhaust-gas-turbine-driven compressor is shown in a single figure comprising an axial section in the accompanying drawing.

The compressor housing 1 includes the usual volute channel 2 carried upon a radial part 3 which is extended axially at its inner periphery 4 to receive a bearing housing 5 secured by set screws 6 to the part 4. The compressor housing has also an extension 7 on the turbine side to receive a heat shield 8 which fits on the periphery of the part 7. In the bearing housing 5 are journal bearings 9 and 11 which carry a shaft 12. The heat shield 8 makes a substantially gas tight joint with a ring 13 upon the shaft. Upon the left hand reduced end of the shaft 12 is keyed the impeller 14 of the compressor. The compressor housing is completed by an end plate 15 through which air is taken in.

The right hand end of the shaft 12 carries, beyond the heat shield 8, a thin radial plate-like extension 16 having a peripheral flange 17. Upon this is screwed the hub 18 of the turbine impeller 19. The parts 16, 17, 18 are formed with abutting parts, as 20, so that when the hub is screwed home the greater part of its surface is out of contact with the plate-like extension 16. The principal member of the turbine housing is indicated by 21 and this is completed on the outer side by an end plate and exhaust channel casting 22. The turbine housing 21 is attached to the compressor housing 2 by means of an end plate 23 integral with a thin cylindrical shell 24 of large diameter flanged at 25 for attachment by studs 26 to the compressor housing.

It will thus be seen that while the turbine impeller hub 18 is securely attached to the shaft 12 of the compressor impeller 14 the attachment is through the thin plate-like part 16, the form of which much limits the transfer of heat from the turbine to the shaft, and therefore to the bearings 9, 11, both because the conductive path is long and also because it is of small cross-section. Similarly while the turbine housing is solidly attached to the compressor housing the attachment is through a thin shell 24 which is equally ill-adapted to conduct heat from the turbine to the compressor both because of its length and because of its small cross-section. Thus the transfer of heat by conductivity is small. Transfer of heat by radiation is largely prevented by the heat shield 8 which is in contact with the compressor housing 1 only at an area, namely the end of the extension 7, which is remote from the bearing housing 5 and the bearings 9 and 11.

Transfer of heat from the turbine to the compressor is still further reduced by positive cooling by the aid of air taken from the delivery side of the compressor. In the body 1 of the compressor are drilled passages 27 extending from the delivery side of the compressor to the narrow annular gap 28 between the heat shield 8 and the shell 24. Air passing through these passages cools the inner surface of the shell 24 and then passes radially inward between the heat shield 8 and the turbine to pass through openings 29 in the plate-like member 16 into the space 31 between the part 16 and the turbine impeller. Passages 32 are also drilled in the hub 18 to convey air from the space 31 to the turbine exhaust.

I claim:

An exhaust-gas-turbine-driven-compressor comprising a compressor housing of light metal, bearings mounted therein, a shaft carried in said bearings, a compressor impeller within said housing upon one end of said shaft, a turbine housing of refractory metal, a thin shell of metal uniting said turbine housing to said compressor housing and closely surrounding a part of said compressor housing whereby an annular channel of small radial depth is formed between them, a thin perforated plate of metal upon the other end of said shaft, a turbine impeller screwing upon the periphery of said plate and having a hub elsewhere spaced from said plate with passages therethrough extending from the space between said hub and said plate, a heat shield extending radially from said channel to said shaft between said thin perforated plate and the compressor housing, said compressor housing having channels therein extending from the delivery side of the compressor to the channel between the housing and said shell, whereby air is caused to flow over the inner surface of said shell, over said heat shield, over and through said thin perforated plate and over and through the impeller hub.

References Cited in the file of this patent

UNITED STATES PATENTS

| | | |
|---|---|---|
| 2,283,176 | Birmann | May 19, 1942 |
| 2,484,275 | Eastman | Oct. 11, 1949 |
| 2,577,179 | Buchi | Dec. 4, 1951 |
| 2,578,785 | Davis | Dec. 18, 1951 |
| 2,620,123 | Parducci | Dec. 2, 1952 |
| 2,646,210 | Kohlmann et al. | July 21, 1953 |
| 2,648,491 | Wood | Aug. 11, 1953 |